(12) United States Patent
Boshuizen et al.

(10) Patent No.: US 8,827,120 B2
(45) Date of Patent: Sep. 9, 2014

(54) DISPENSER WITH DISCHARGE QUANTITY SELECTOR

(75) Inventors: Sylvia Boshuizen, Leiden (NL); Maria Levina Weststrate, Deventer (NL)

(73) Assignee: Rubbermaid Commercial Products, LLC, Winchester, VA (US)

( * ) Notice: Subject to any disclaimer, the term of this patent is extended or adjusted under 35 U.S.C. 154(b) by 322 days.

(21) Appl. No.: 12/939,214

(22) Filed: Nov. 4, 2010

(65) Prior Publication Data

US 2012/0080452 A1 Apr. 5, 2012

Related U.S. Application Data (60) Provisional application No. 61/388,213, filed on Sep. 30, 2010.

(51) Int. Cl.
*B65D 88/54* (2006.01)
*G01F 11/00* (2006.01)
*G01F 11/28* (2006.01)
*B67D 7/06* (2010.01)

(52) U.S. Cl.
CPC ..................................... *G01F 11/00* (2013.01)
USPC .......... 222/309; 222/181.3; 222/282; 222/434

(58) Field of Classification Search
USPC .............. 222/309, 181.3, 287, 434, 305, 105, 222/153.11, 153.14, 282, 181.1, 181.2, 71, 222/185.1, 291, 153.13
See application file for complete search history.

(56) References Cited

U.S. PATENT DOCUMENTS

| 2,605,021 | A | * | 7/1952 | Churchill et al. | ........ 222/153.03 |
| 4,142,654 | A | * | 3/1979 | Doubleday et al. | ........... 222/309 |
| 4,238,056 | A | * | 12/1980 | Tucker et al. | .............. 222/181.2 |
| 5,443,236 | A | * | 8/1995 | Bell et al. | .................... 248/311.3 |
| 6,068,162 | A | | 5/2000 | De Winter et al. | |
| 6,189,740 | B1 | | 2/2001 | Wade et al. | |
| 6,832,701 | B2 | * | 12/2004 | Schiller | ....................... 222/181.3 |
| 7,798,371 | B2 | * | 9/2010 | Ophardt | ..................... 222/181.3 |
| 8,009,015 | B2 | * | 8/2011 | Sayers et al. | .................. 340/5.64 |
| 2006/0131329 | A1 | * | 6/2006 | Sayers et al. | .................. 222/105 |
| 2008/0121659 | A1 | * | 5/2008 | Ophardt | ..................... 222/181.3 |
| 2009/0302067 | A1 | | 12/2009 | Hendrickx et al. | |
| 2010/0089953 | A1 | * | 4/2010 | Lakic | ............................ 222/309 |
| 2010/0140297 | A1 | | 6/2010 | Ophardt et al. | |

OTHER PUBLICATIONS

PCT, PCT International Search Report and Written Opinion for International Application No. PCT/US2011/053995 dated Feb. 21, 2012.

* cited by examiner

*Primary Examiner* — Paul R Durand
*Assistant Examiner* — Matthew Lembo
(74) *Attorney, Agent, or Firm* — Dennis J. Williamson; Moore & Van Allen PLLC (57) ABSTRACT

A dispensing apparatus that provides for selectively controlling discharge quantity. The dispensing apparatus may include a pump and a housing. The pump includes a first portion and a second portion linearly movable relative to the first portion, and the housing is for securing the portion of the pump. A distance of movement of the second portion toward the first portion is the pump stroke, and the pump stroke may be selectively varied. A dispensing module may include a pump, a rotatably mounted stroke selector including a plurality of arms that allow movement of a stop member associated with a moveable portion of the pump for predetermined and different distances depending on which arm of the stroke selector, if any, engages the stop member, with the distance of allowed movement of the stop member being variable depending on the angular position of the stroke selector.

13 Claims, 14 Drawing Sheets

DISPENSER WITH DISCHARGE QUANTITY SELECTOR

CROSS-REFERENCE TO RELATED APPLICATION

This application claims the benefit of U.S. Provisional Application No. 61/388,213, filed Sep. 30, 2010, entitled "DISPENSER WITH DISCHARGE QUANTITY SELECTOR," the contents of which are hereby incorporated by reference in their entirety.

BACKGROUND

The dispenser disclosed herein relates generally to the field of materials discharged from a container with a pump, and particularly to control of the quantity of material discharged by a dispenser.

Dispensers are known that include a pump for discharging material, such as soap, hand sanitizer, or lotion, from a pouch or other container. Such dispensers for soap are commonly found, for example, mounted to walls in restrooms of restaurants, commercial offices, and other buildings. Such dispensers for hand sanitizer are found in many other areas of buildings. In mechanically actuated dispensers, the pump may be actuated by a handle at the lower end of the dispenser, and the material is discharged at an outlet from the pump proximate to the bottom of the dispenser. However, conventional dispensers lack the ability to control or vary the amount of material discharged. Differences in applications and locations of use may make it desirable to increase or decrease the default amount discharged from the pump. For example, a restroom in a restaurant may have a different need for quantity of soap than an automotive repair shop. Further, different materials may have different viscosities, and depending on pump design, one stroke of a pump for a thin material may discharge more material than the same stroke of a thick material. The difference in viscosities of soap and sanitizer, or even within the same categories of materials, may result in different quantities being discharged from the same pump.

An improved dispenser that allows selection and varying of the quantity of material to be discharged is desired.

SUMMARY

In accordance with one embodiment described herein, a dispensing apparatus is provided. The dispensing apparatus includes a pump and a housing. The pump includes a first portion and a second portion linearly movable relative to the first portion, and the housing is for securing the portion of the pump. A distance of movement of the second portion toward the first portion is the pump stroke, and the pump stroke may be selectively varied.

In accordance with another embodiment described herein, a dispensing apparatus for discharging a material from a reservoir is provided. The dispensing apparatus includes a mounting structure, a dispensing module, and an actuator. The dispensing module includes a module housing with a first portion mounted to the mounting structure and a second portion that is movable relative to the first portion along a longitudinal axis and is resiliently biased away from the first portion. A pump is mounted to the module housing first portion and is adapted to receive the material from the reservoir. The pump includes an outlet adapted to discharge the material and a bearing surface adapted to receive a force exerted by the module housing second portion to result in a pump stroke. A stop member extends from the module housing second portion parallel to the longitudinal axis in the direction of the module housing first portion. A stroke selector is rotatably mounted to the module housing first portion and includes a plurality of arms of varying length. The stroke selector allows movement of the stop member for predetermined and different distances depending on which arm, if any, engages the stop member, with the distance of allowed movement of the stop member being variable depending on the angular position of the stroke selector. The actuator operatively engages the module housing second portion.

In accordance with another embodiment described herein, a method of operating a dispensing apparatus for discharging a material from a reservoir is provided. The method includes selecting between a plurality of positions of a member that varies a stroke of a pump, applying force to an actuator, and receiving the material in a quantity as discharged by the pump depending on the selected stroke.

BRIEF DESCRIPTION OF THE DRAWINGS

For a more complete understanding of the dispenser described herein, reference should now be had to the embodiments shown in the accompanying drawings and described below. In the drawings.

DETAILED DESCRIPTION

Certain terminology is used herein for convenience only and is not to be taken as a limitation on the embodiments described. For example, words such as "top", "bottom", "upper," "lower," "left," "right," "horizontal," "vertical," "upward," and "downward" merely describe the configuration shown in the figures. Indeed, the referenced components may be oriented in any direction and the terminology, therefore, should be understood as encompassing such variations unless specified otherwise.

Figure 1:
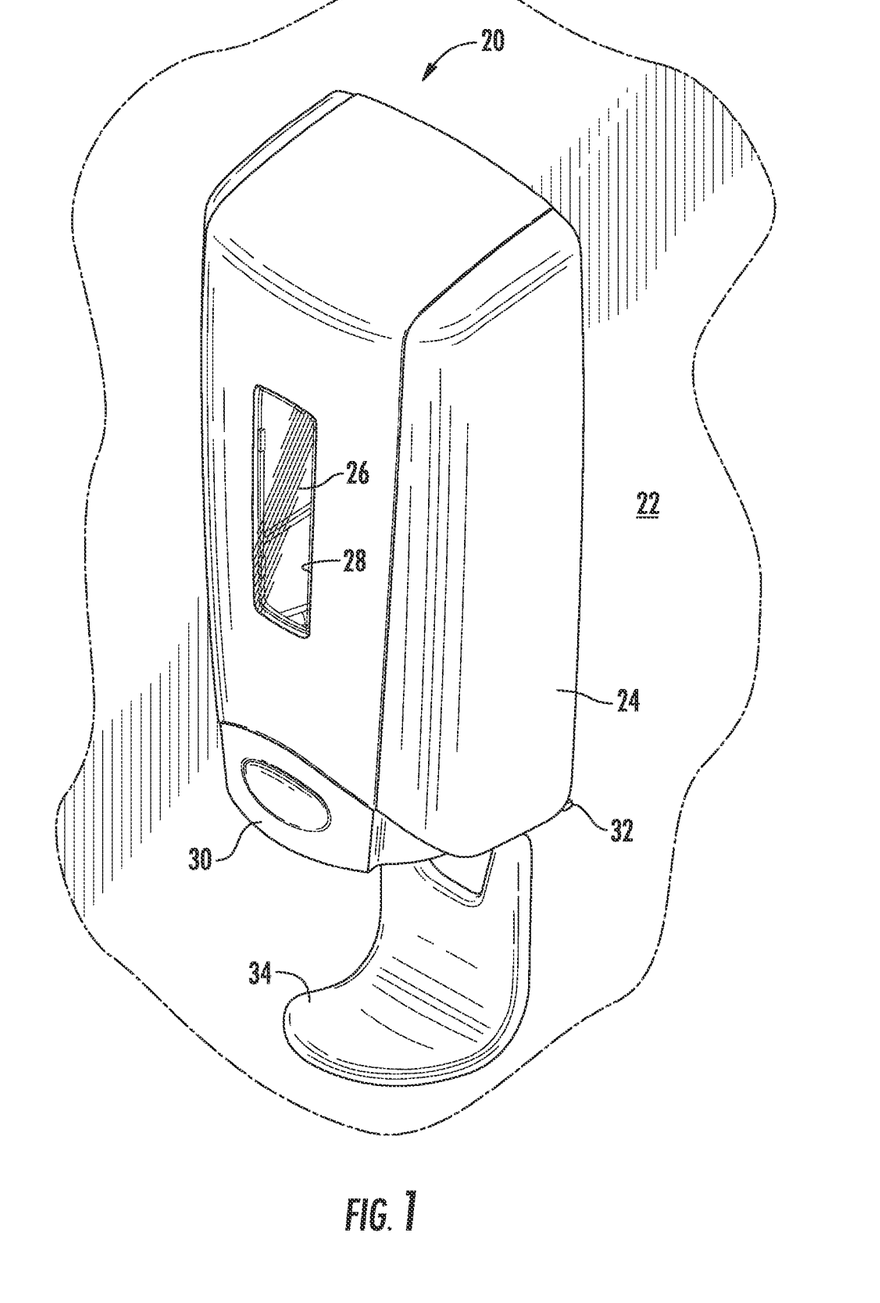
FIG. 1 is a perspective view of an embodiment of a dispenser mounted to a wall.
Figure 2:
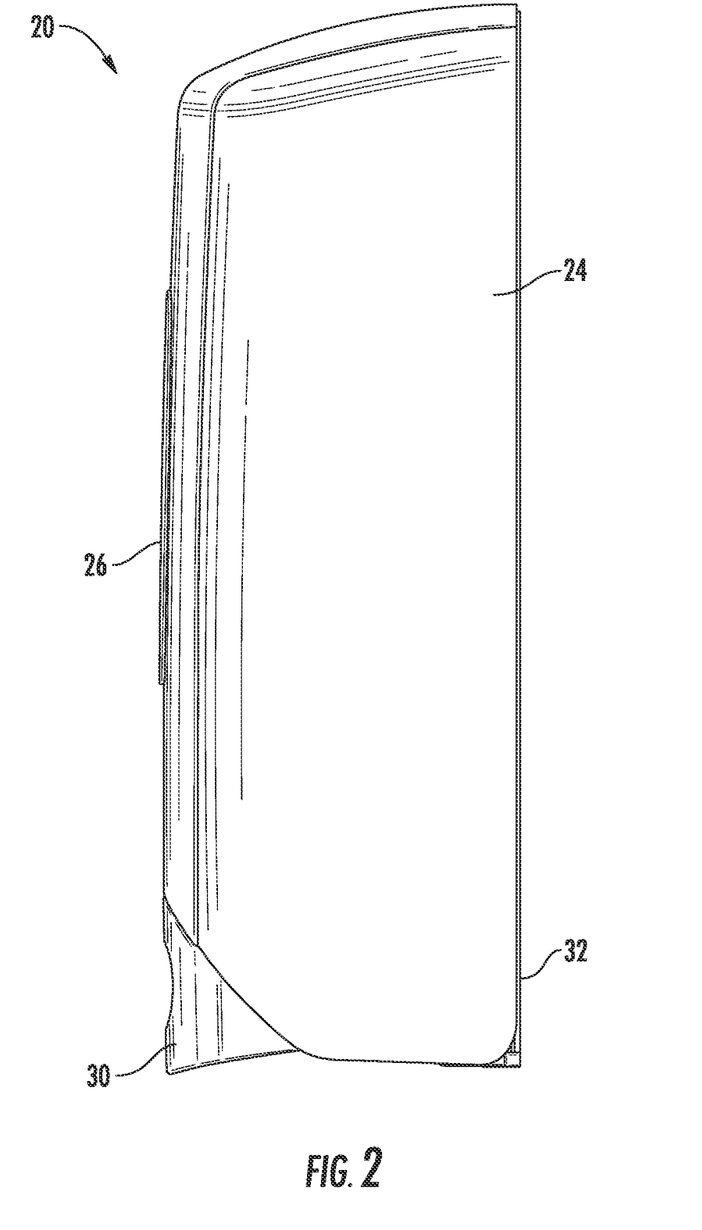
FIG. 2 is side elevation view of the dispenser shown in FIG. 1.

Referring now to the drawings, wherein like reference numerals designate corresponding or similar elements throughout the several views, an embodiment of a dispenser is shown in FIGS. 1 and 2, and is generally designated at 20. The dispenser 20 is shown mounted to a wall 22, though other mounting configurations, such as to a post or pole, are possible. The dispenser includes a cover 24, a window 26 in an aperture 28 in the cover 24 to provide viewing through the cover 24 of the dispenser material contents, a handle 30, and a back plate 32. As shown in FIG. 1, a drip tray 34 positioned beneath the dispenser outlet may be provided that is mounted to the bottom of the dispenser 20; one location for such a mounting may be to the back plate 32 of the dispenser 20. The working material in the dispenser may be substances such as soap, shampoo, shower gel, detergent, exfoliating scrub, lotion, sanitizer, other skin care product, a combination thereof, any material used on a person's hands, or any flowable material. Such materials may take forms including but not limited to liquid, gel, foam, spray, or solid, such as powder or flakes.

Figure 3:
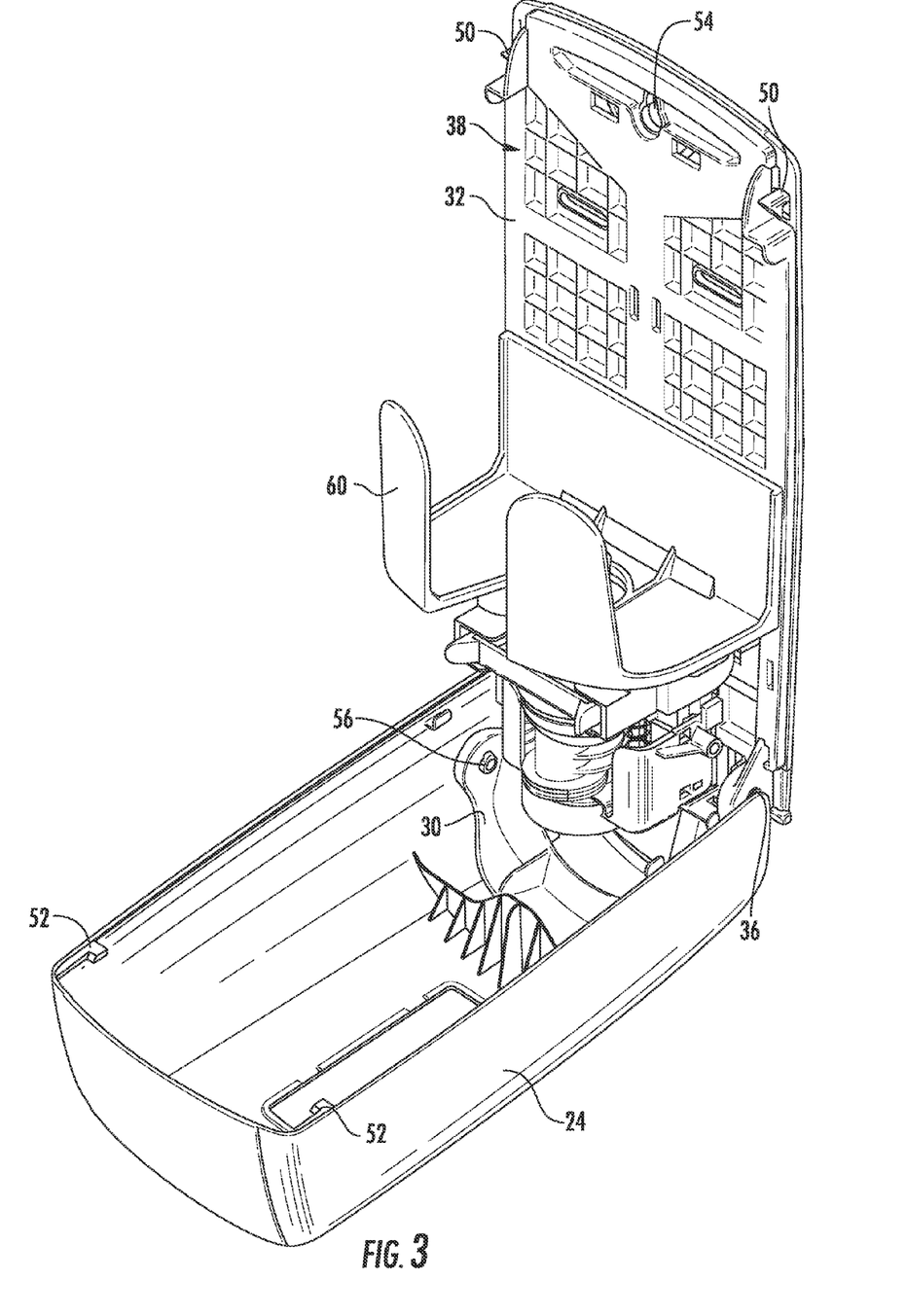
FIG. 3 is a perspective view of the dispenser shown in FIG. 1 with the cover open.
Figure 4:
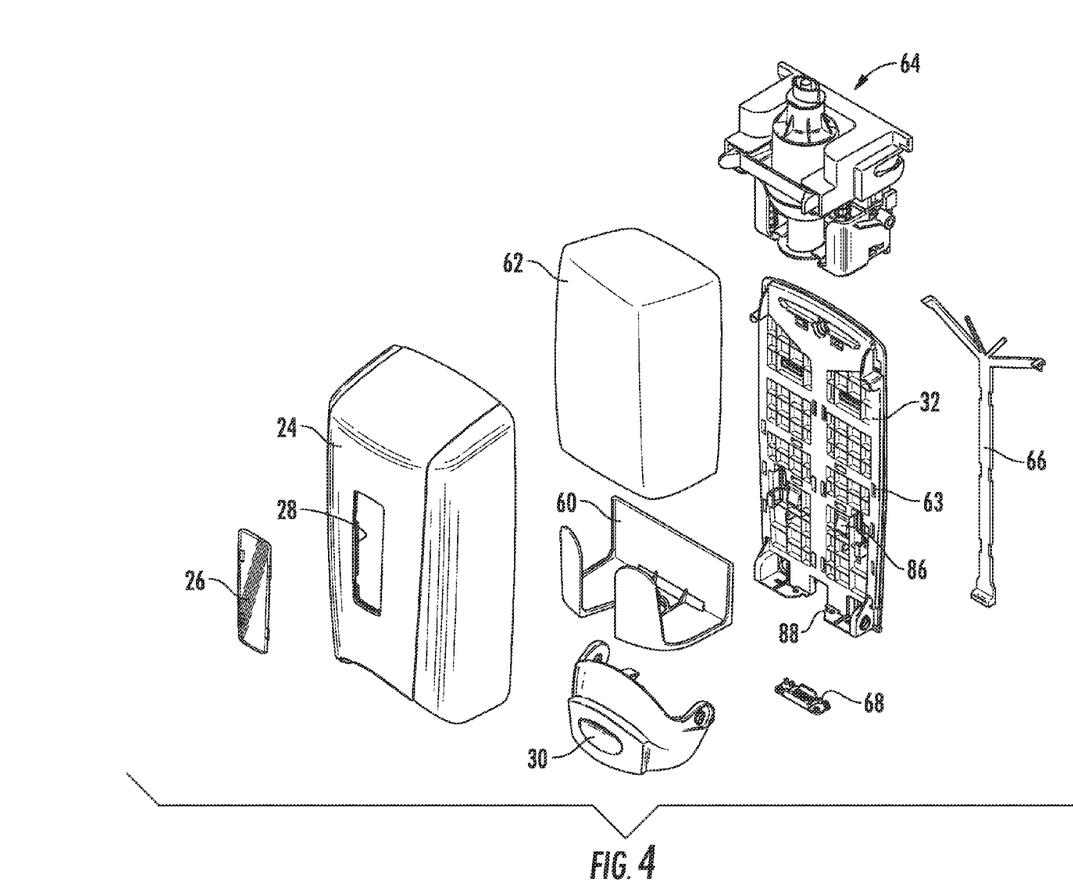
FIG. 4 is an exploded perspective view of the dispenser shown in FIG. 1.

FIG. 3 shows the pivotal mounting 36 of the cover 24 to the back plate 32. The cover 24 is rotated to the open position, exposing the inside of the cover 24, the inside of the handle 30, the front 38 of the back plate 32, and latches 50 on the back plate 32 to receive tabs 52 on the cover 24 when the cover 24 is closed. The back plate 32 is securely mounted to the wall 22 using mounting screws or other fasteners through a keyhole opening 54. The handle 30 is mounted to the inside of the walls of the cover 24 at pivotal mountings 56. Referring to FIGS. 3 and 4, a reservoir holder 60 for supporting a reservoir 62 of material to be dispensed is provided. The reservoir 62 may be, for example, a container or a flexible pouch. The holder 60 may be mounted to the back plate 32 with hooks (not shown) integral to the holder 60 that may be inserted into slots 63 in the back plate. A dispensing module 64 is in communication with the container 62; such communication may be fluid communication if the material in the container 62 is a liquid, foam, gel, spray, or other flowable material, or may also be in communication with the container if the material is a solid such as a powder or flakes. As shown in FIG. 3, the dispensing module 64 is mounted to the back plate 32 beneath the container holder 60. FIG. 4 shows a lock 66 and optional lock cover 68 that may be used to secure the cover 24 to the back plate 32.

FIGS. 5-8 show the various components of an embodiment of the dispensing module 64. A pump 80 is mounted to a two-piece housing, with one piece being a stationary housing piece 82 that serves as a base and the other piece being a movable housing piece 84. The pump 80 may be, for example, a linearly actuated pump known to one of ordinary skill in the art having a body, a portion that moves relative to the body, an inlet 81 for connecting to a container of material to be pumped, and an outlet (not visible). As shown in FIG. 4, the stationary housing piece 82 is mounted to the back plate 32 through holes 88 and is kept in place with snaps 86 in the back plate 32. The stationary housing piece 82 includes a collar portion 90 with an interior horizontal channel 92 extending along the sides 94. An adapter 96 extends around the pump 80 and is received in the channel 92. A substantially U-shaped adapter lock 100 has two legs 102 that are received in the back side 104 of the stationary housing piece 82 and into the channel 92. Clips 106 at the ends of the legs 102 latch onto the adapter 96 to secure the pump 80 to the stationary housing piece 82. The portion of the pump 80 that is secured to the stationary housing piece 82 is in a fixed position.

Figure 5:
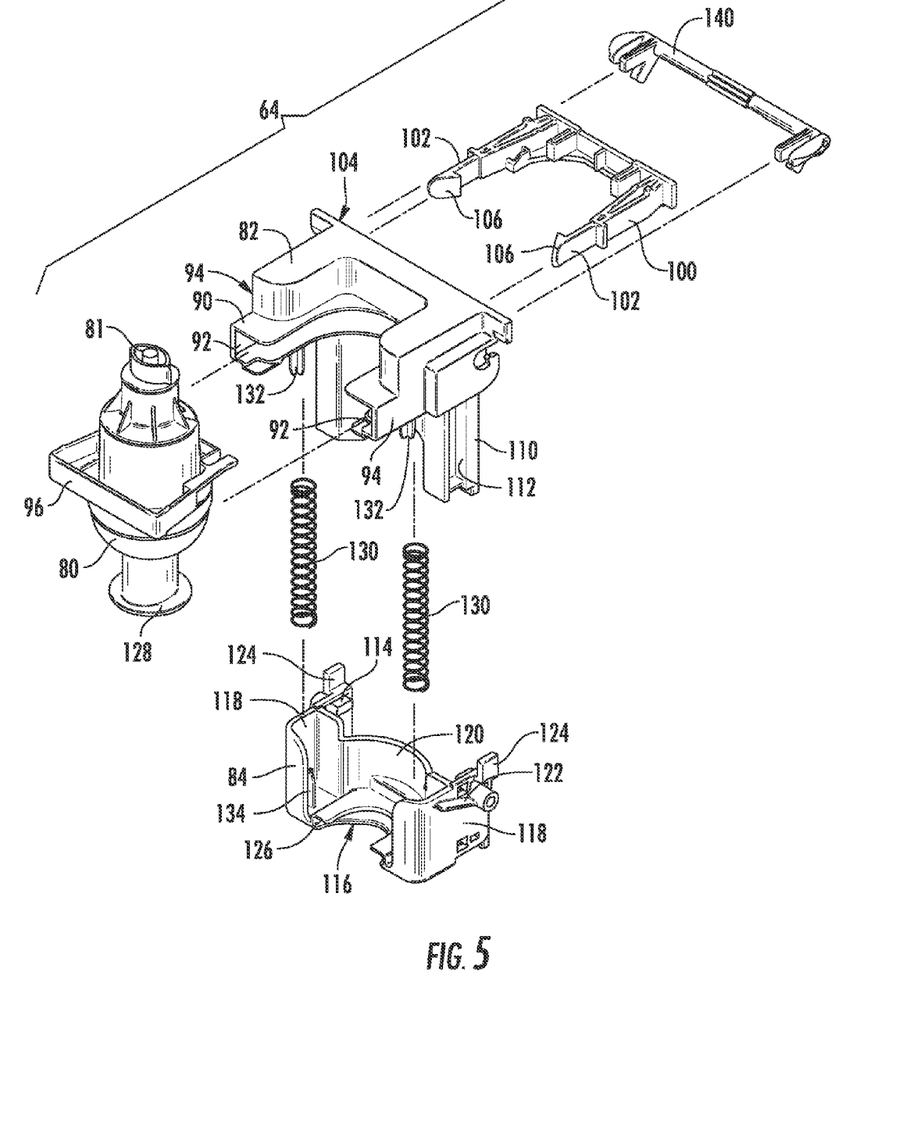
FIG. 5 is an exploded front perspective view of an embodiment of a dispensing module of the dispenser shown in FIG. 1.
Figure 6:
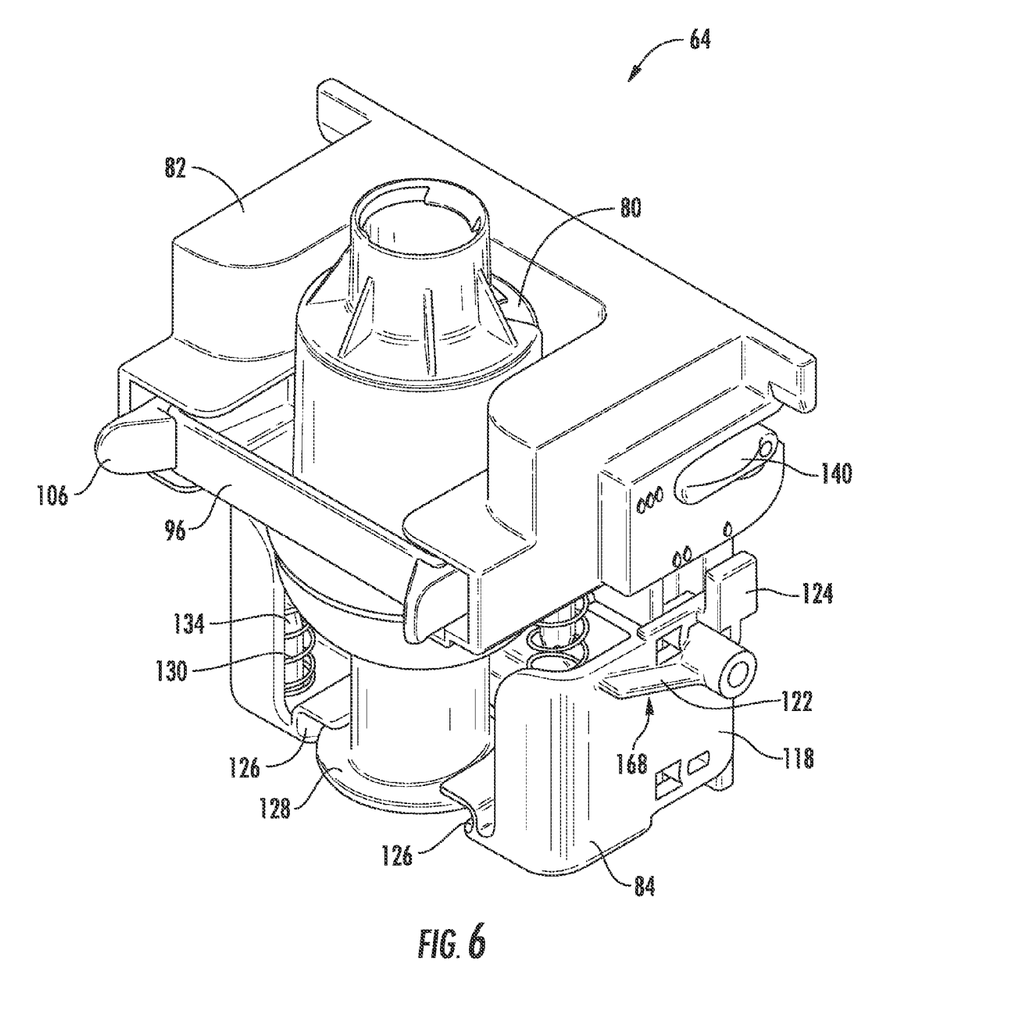
FIG. 6 is a front perspective view of the dispensing module shown in FIG. 5, assembled.
Figure 7:
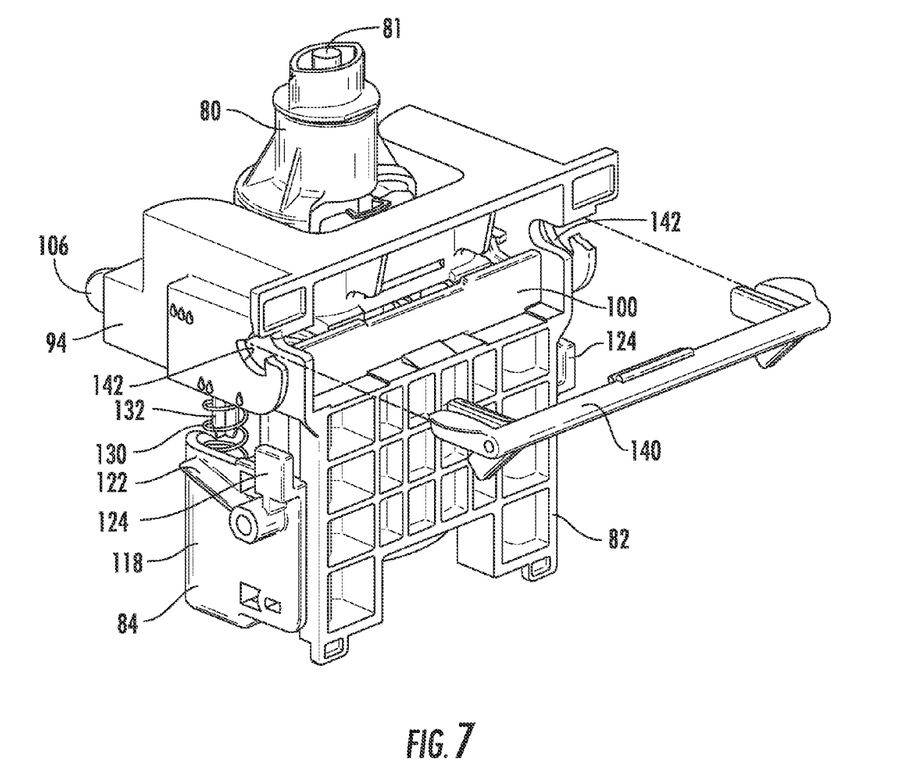
FIG. 7 is a partially exploded rear perspective view of the dispensing module shown in FIG. 5.

Vertical legs 110 extend downward from the collar portion 90 of the stationary housing piece 82. The vertical legs 110 include vertical channels 112 in which tabs 114 of the movable housing piece 84 are slidably received. The movable housing piece 84 has a base 116, side walls 118 and a back wall 120 extending upward from the base 116, bearing members 122 extending laterally from the side walls 118, and stops 124 extending upward from the rear of the side walls 118. The base 116 includes a channel 126 that receives an annular flange 128 proximate to the lower end of the pump 80. Springs 130 are disposed around posts 132 that extend downward from the collar portion 90 of the stationary housing piece 82 and posts 134 that extend upward from the base 116 of the moveable housing piece 84, and resiliently bias the movable housing piece 84 away from the stationary housing piece 82.

Figure 8:
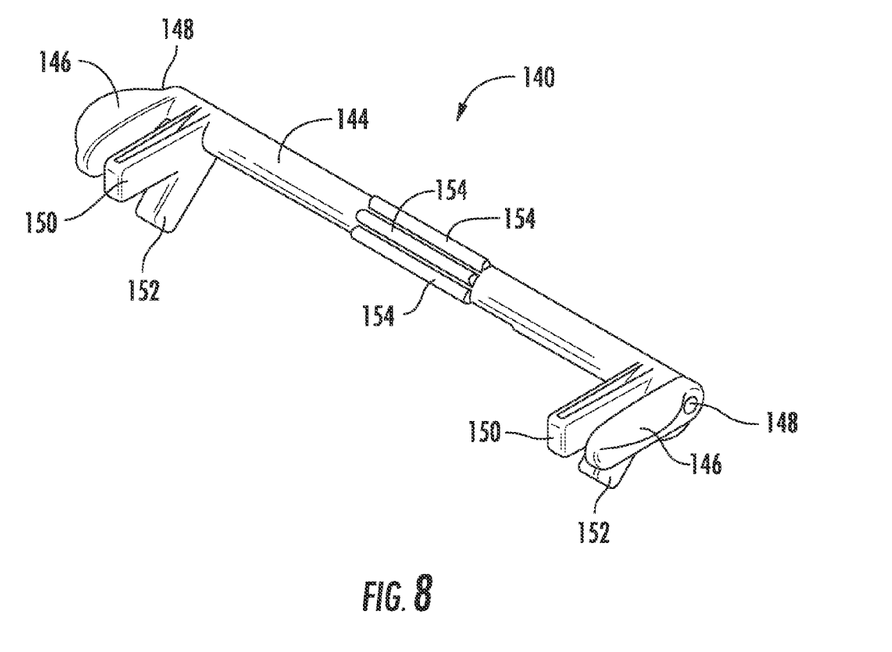
FIG. 8 is a perspective view of an embodiment of a restrictor element of the dispensing module shown in FIG. 5.

An embodiment of a stroke restrictor 140 is received in openings 142 in the sides 94 of the stationary housing piece 82. As shown in FIG. 8, the stroke restrictor 140 includes a rod 144 with levers 146 at each end 148, and a long arm 150 and a short arm 152 proximate to each end 148. The levers 146, long arms 150, and short arms 152 extend radially from the rod, with the long arms 150 substantially parallel to the levers 146 and the short arms 152 offset at an angle from the long arms 150. When inserted into the openings 142, the levers 146 continue to be externally visible when the cover 24 is removed. There are three detents 154 centrally located on the rod 144 that provide registration with an adjacent edge of the adapter lock 100 and secure the stroke restrictor 140 in each of three positions. The stroke restrictor 140 is effectively a blocking member that impedes upward progress of the moveable housing piece 84 through contact with the stops 124. Other embodiments of a stroke restrictor are possible for blocking the stops 124. For example, a sliding, linear moving stroke restrictor could be implemented that is vertically oriented, or a series of horizontally oriented sliding stroke restrictors could be provided.

Figure 9:
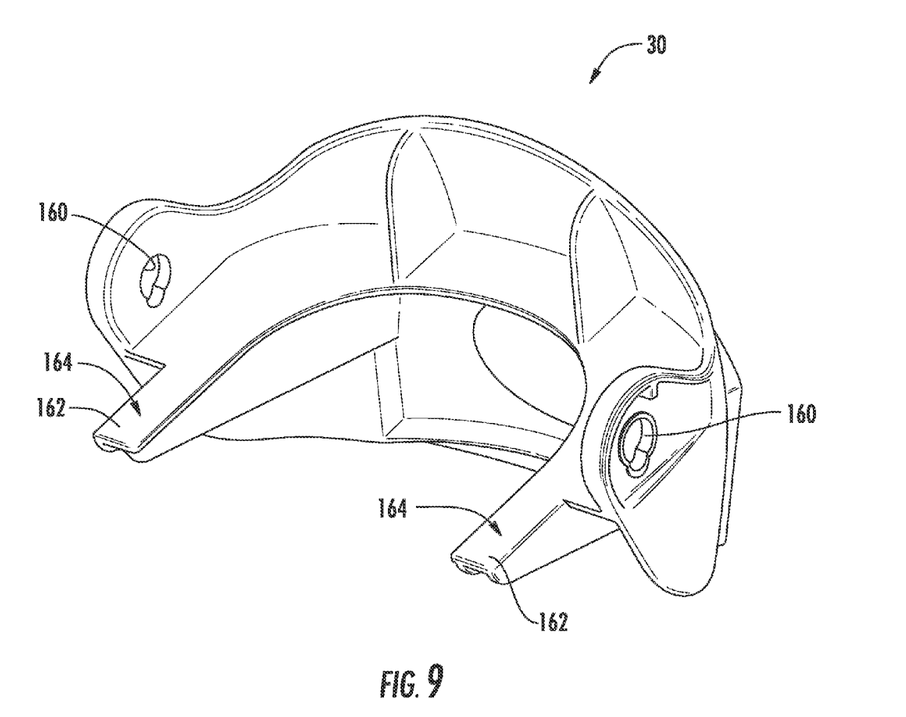
FIG. 9 is a rear elevation view of an embodiment of a handle of the dispenser shown in FIG. 4.
Figure 10:
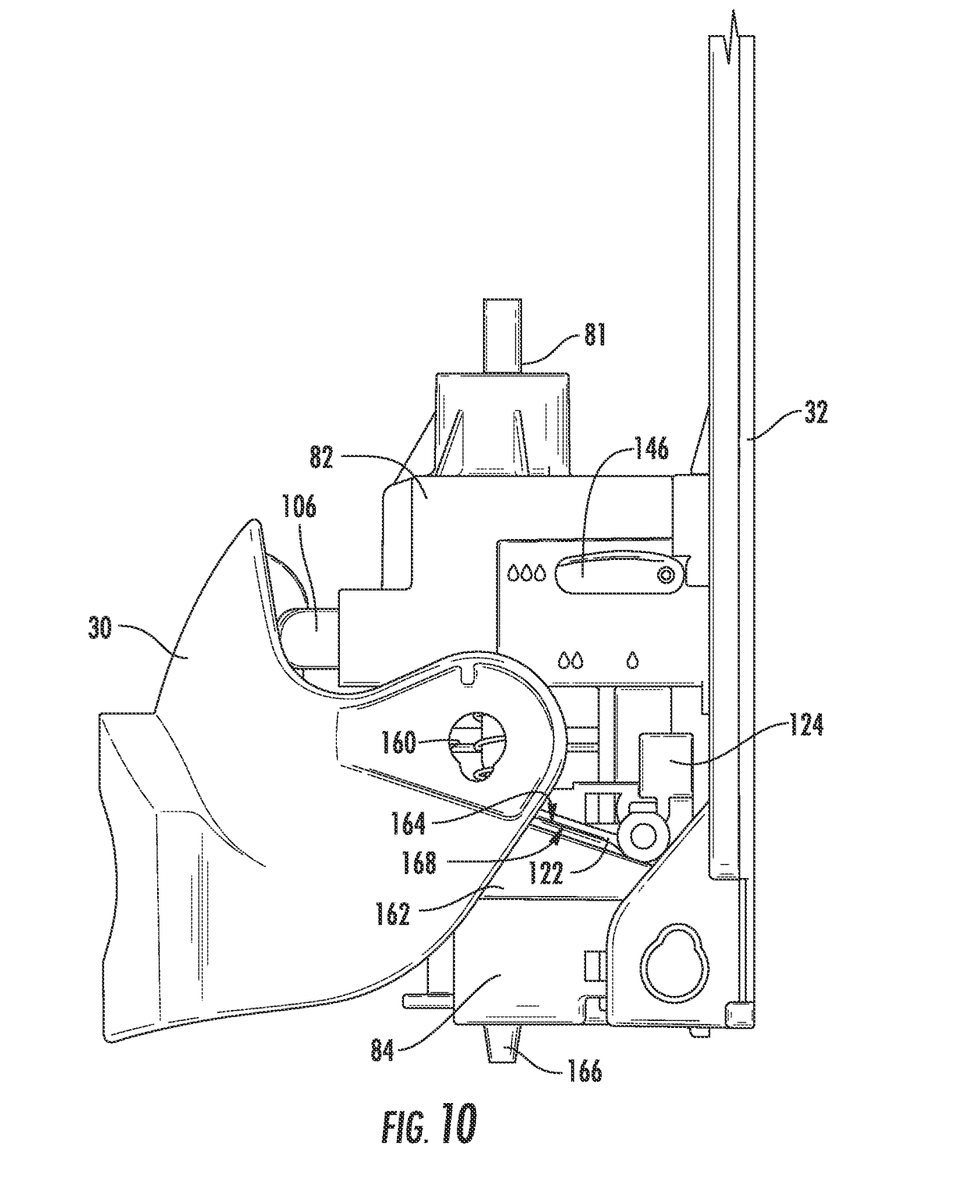
FIG. 10 is a side elevation view of the handle, dispenser, and back plate of the dispenser shown in FIG. 4.

FIG. 9 shows the back side of the handle 30. Mounting holes 160 are provided at each side of the handle. Two lifting members 162 each having a top surface 164 extend rearward out of the handle 30 inside of each side. FIG. 10 shows the handle 30 in place relative to the dispensing module 64 where a discharge outlet 166 may be seen. The top surface 164 of the lifting member 162 abuts the bottom surface 168 of the bearing member 122.

When the handle 30 is pressed, the handle 30 rotates around the mounting holes 160 and the lifting members 162 move upward. The top surface 164 of the lifting member 162 applies force to the bottom surface 168 of the bearing member 122, urging the bearing member 122 and the moveable housing piece 84 upward. As the moveable housing piece 84 moves upward, the flange 128 proximate to the lower end of the pump 80 is moved upward, and the pump is actuated. The moveable housing piece 84 is effectively a force translation member or hammer that translates the force from the handle 30 to the moveable portion of the pump 80, which in the embodiment shown includes the flange 128. The distance of the movement of the flange 128 is equal to the pump stroke.

Figure 11:
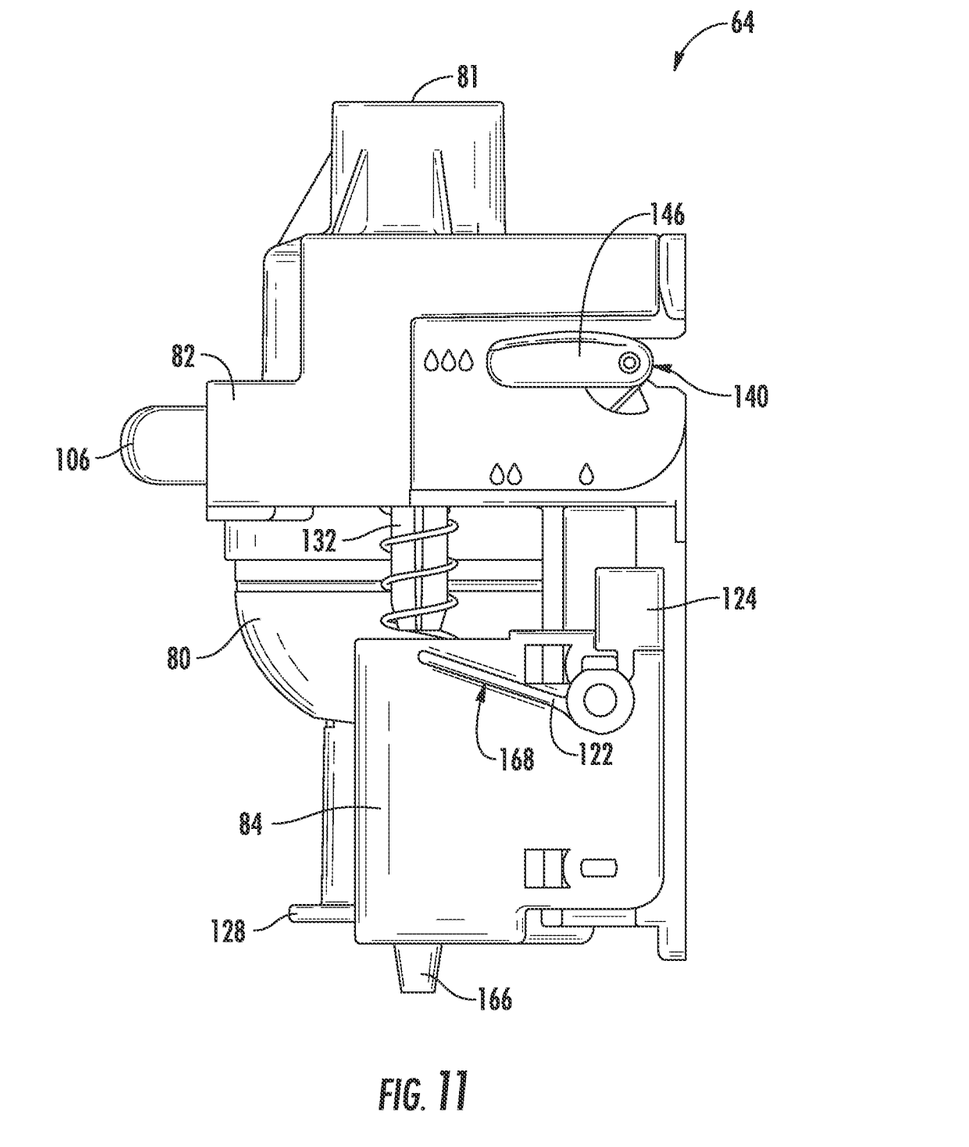
FIG. 11 is a side elevation view of the dispensing module shown in FIG. 5, assembled.
Figure 12A:
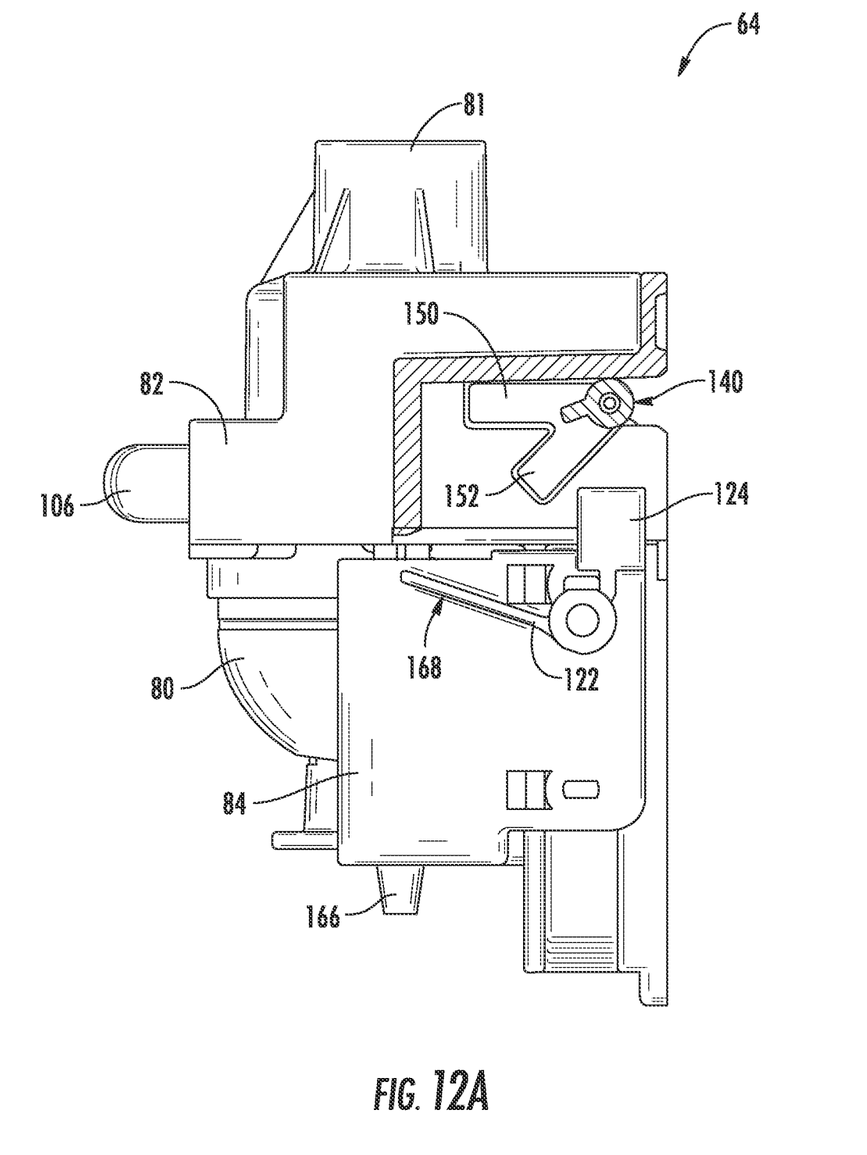
FIGS. 12A, 12B, and 12C are partial section side views of various positions of the restrictor element of the dispensing module shown in FIG. 5.
Figure 12B:
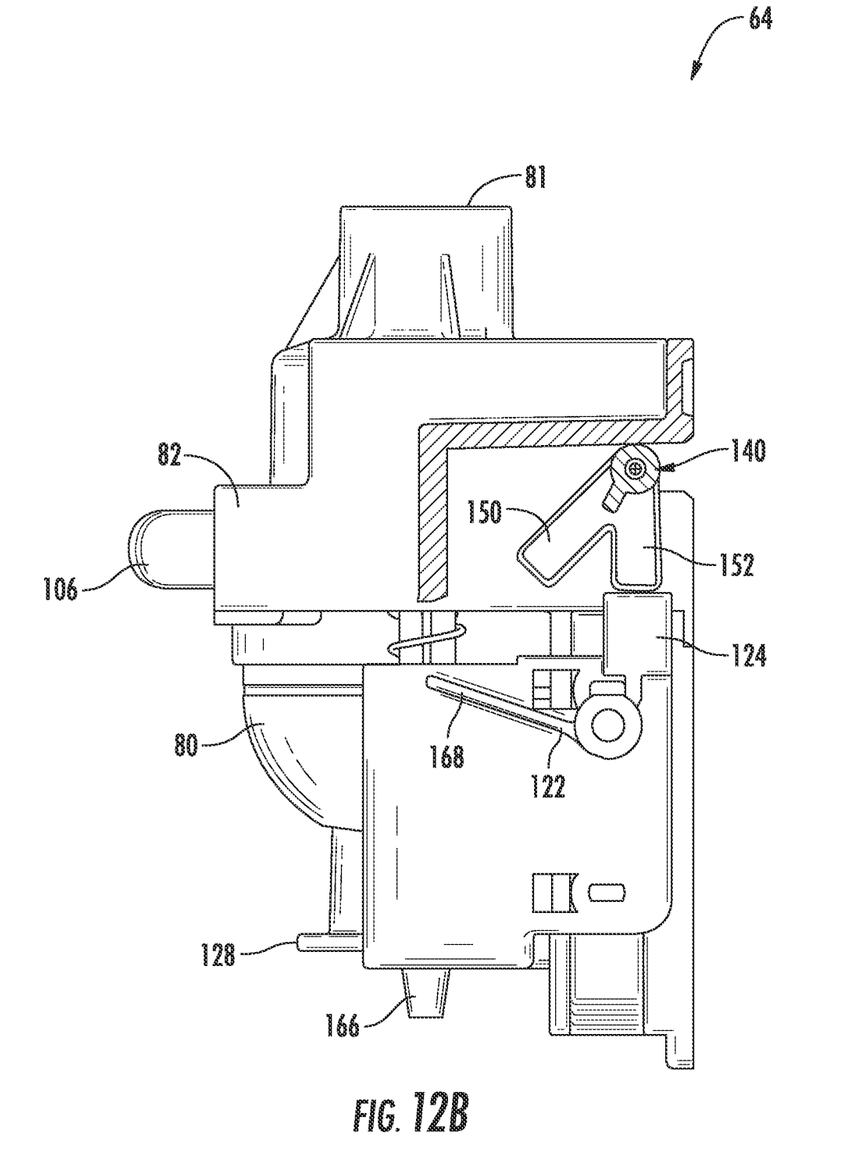
Figure 12C:
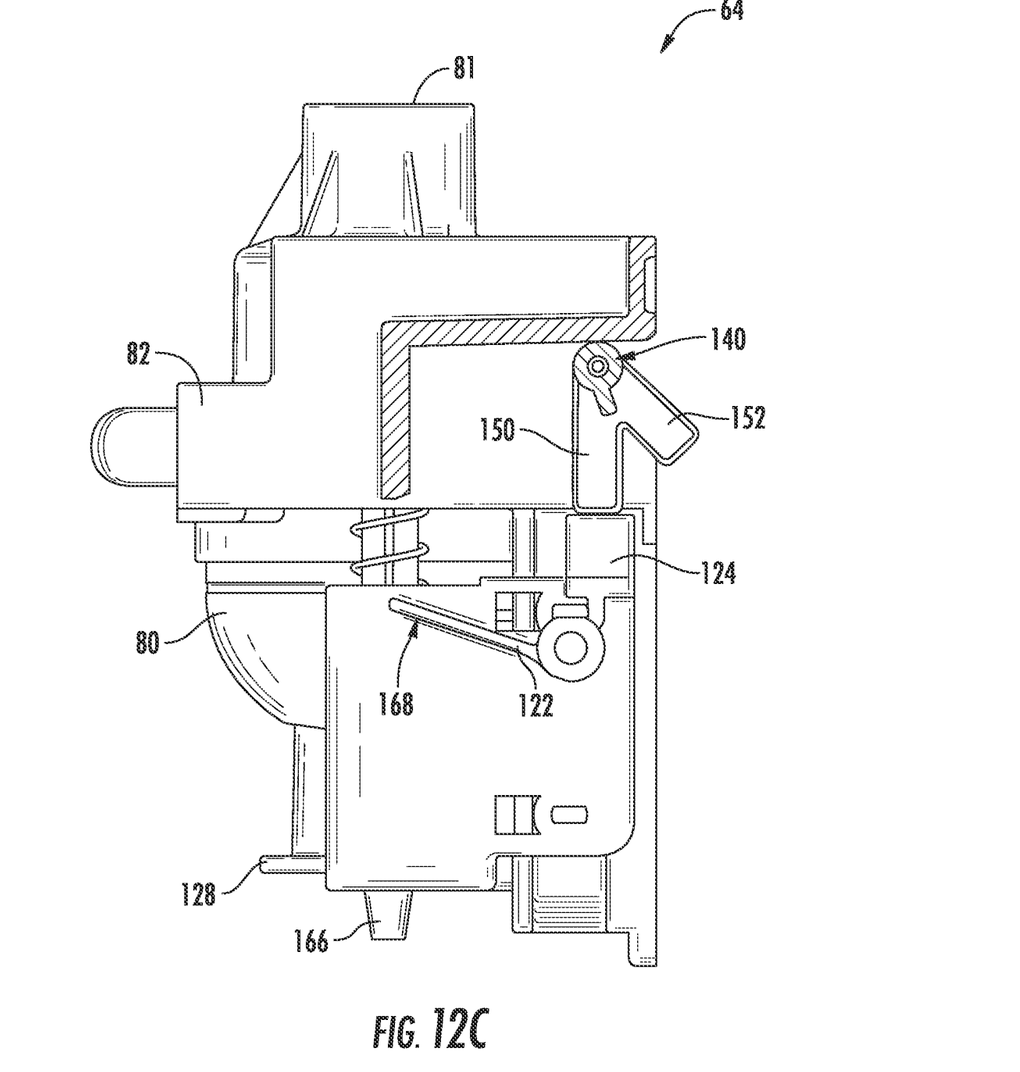

FIG. 11 shows the dispensing module 64 in the state of non-use, with the moveable housing piece 84 spaced the maximum distance from the stationary housing piece 82. FIGS. 12A, 12B, and 12C show the operation of the stroke restrictor 140. The position of rotation of the stroke restrictor 140 allows a user to select the pump stroke, thereby selecting the relative amount of material to be discharged by the pump 80. In FIG. 12A, the long arm 150 is horizontal, withdrawing both arms 150, 152 from the path of the stop 124. The moveable housing piece 84, unobstructed by the stroke restrictor 140, may move upward until impacting the stationary housing piece 82, which is the maximum pump stroke. In FIG. 12B, the stroke restrictor 140 is rotated counterclockwise such that the short arm 152 is vertical. The moveable housing piece 84 may therefore move upward only to the point where the stop 124 impacts the short arm 152, and the pump stroke is restricted by the short arm 152 to be shorter than the maximum stroke. In FIG. 12C, the stroke restrictor 140 is rotated further counterclockwise such that the long arm 150 is vertical. The moveable housing piece 84 may move upward only to the point where the stop 124 impacts the long arm 150, and the pump stroke is additionally restricted by the long arm 150 to a yet shorter stroke. The amount of material discharged by the pump 80 is greatest at the maximum pump stroke, is reduced with the stroke restricted by the short arm 152, and is the least with the stroke restricted by the long arm 150.

The materials of the cleaning material dispenser 20 may generally be expected to be molded plastic for most parts, in particular polyethylene, polypropylene, talc filled polypropylene (PP talc), polyvinyl chloride (PVC), polyoxymethylene (POM), styrene acrylonitrile (SAN), or other polymer, and metal for fasteners, possibly for some hinges, and for springs, in particular steel alloy, but may be as selected by one of ordinary skill in the art.

Although the present invention has been shown and described in considerable detail with respect to only a few exemplary embodiments thereof, it should be understood by those skilled in the art that there is no intent to limit the invention to the embodiments since various modifications, omissions, and additions may be made to the disclosed embodiments without materially departing from the novel teachings and advantages of the invention, particularly in light of the foregoing teachings. For example, some of the novel features of the dispenser could be applied to any type of mechanical or electromechanical dispenser, whether related to skin care products or otherwise. Accordingly, it is intended to cover all such modifications, omission, additions, and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A dispensing apparatus comprising:
   a pump including a first portion and a second portion linearly movable relative to the first portion, wherein a distance of movement of the second portion toward the first portion is the pump stroke;
   a housing adapted to be secured to a wall, the first portion of the pump being secured in the housing and the housing comprising a movable cover;
   a force translation member mounted to the housing for operatively applying force to the second portion of the pump to urge the second portion toward the first portion; and
   a stroke restrictor mounted in the housing and comprising an elongated rod with a plurality of arms of at least two different lengths extending therefrom, wherein the rod may be rotated to cause one of the plurality of arms to selectively engage the force translation member when the second portion is advanced toward the first portion, and wherein an angular position of the stroke restrictor determines the pump stroke.

2. The dispensing apparatus of claim 1, wherein the stroke restrictor may be selectively set to a plurality of positions that provide a corresponding number of pump strokes.

3. The dispensing apparatus of claim 1, further comprising an operator operatively connected to the stroke restrictor to allow manual rotation of the stroke restrictor by application of force to the operator.

4. The dispensing apparatus of claim 1, wherein the plurality of arms includes arms that radially extend from the rod proximate to each end of the rod.

5. The dispensing apparatus of claim 4, wherein the stroke restrictor further comprises a plurality of detents along the rod to secure the angular position of the stroke restrictor.

6. The dispensing apparatus of claim 1, wherein the pump is adapted to discharge material from a reservoir into a person's hand.

7. A dispensing apparatus for discharging a material from a reservoir, the dispensing apparatus comprising:
   a mounting structure adapted to be mounted to a wall and comprising a housing;
   a dispensing module including a first portion mounted to the mounting structure and a second portion, the second portion being movable relative to the first portion along a longitudinal axis and resiliently biased away from the first portion;
   a pump mounted to the dispensing module first portion and adapted to receive the material from the reservoir, the pump including an outlet adapted to discharge the material and a bearing surface adapted to receive a force exerted by the dispensing module second portion to result in a pump stroke;
   a stop member extending from the dispensing module second portion parallel to the longitudinal axis in the direction of the dispensing module first portion; and
   a stroke selector rotatably mounted to the dispensing module first portion and being located inside of the housing, the stroke selector comprising an elongated rod with a plurality of arms extending from adjacent an end of the arm, wherein the rod is rotatable such that one of the plurality of arms is positionable opposite to the stop member, wherein the stroke selector defines an allowed movement of the second portion for predetermined and different distances depending on which one of the plurality of arms engages the stop member, with the distance of allowed movement of the second portion being variable depending on the angular position of the stroke selector; and
   an actuator operatively engaging the module housing second portion.

8. The dispensing apparatus of claim 7, wherein the material is selected from the group comprising soap, shampoo, shower gel, detergent, exfoliating scrub, lotion, sanitizer, other skin care product, and a combination thereof.

9. The dispensing apparatus of claim 7, further comprising:
   a cover mounted to the mounting structure and substantially enclosing the dispensing module; and
   an operator operatively connected to the stroke restrictor to allow manual rotation of the stroke selector by application of force to the operator,
   wherein the operator visibly indicates the position of the stroke selector upon removal of the cover.

10. The dispensing apparatus of claim 7, wherein the plurality of arms includes arms that radially extend from the rod proximate to each end of the rod.

11. The dispensing apparatus of claim 7, further comprising an operator operatively connected to the stroke restrictor to allow manual rotation of the stroke restrictor by application of force to the operator.

12. The dispensing apparatus of claim 7, wherein the stroke restrictor further comprises a plurality of detents along the rod to secure the angular position of the stroke restrictor.

13. A dispensing apparatus comprising:
- a pump configured to receive a material from a reservoir including an outlet adapted to discharge the material including a first portion and a second portion linearly movable relative to the first portion, wherein a distance of movement of the second portion toward the first portion is the pump stroke;
- a dispensing module including a base and a force translation member mounted to the base for operatively applying force to the second portion of the pump to urge the second portion toward the first portion, the force translation member being movable relative to the base along a longitudinal axis and resiliently biased away from the first portion; and
- a stroke restrictor comprising a rod with a plurality of arms extending therefrom, wherein the rod may be rotated to cause one of the plurality of arms to selectively engage the force translation member when the second portion is advanced toward the first portion, and wherein an angular position of the stroke restrictor determines the pump stroke.

* * * * *